8,023,217
Patented Feb. 27, 1962

3,023,217
PROCESS FOR THE INTRODUCTION OF CARBOXYL GROUPS INTO AROMATIC COMPOUNDS
Werner Stein, Dusseldorf-Holthausen, Hubert Schirp, Dusseldorf, and Hartwig Schütt, Dusseldorf-Benrath, Germany, assignors to Henkel & Cie. G.m.b.H., Dusseldorf-Holthausen, Germany, a corporation of Germany
No Drawing. Filed Mar. 24, 1959, Ser. No. 801,456
Claims priority, application Germany Apr. 10, 1958
22 Claims. (Cl. 260—295.5)

This invention relates to a process for the introduction of carboxyl groups into aromatic compounds free from carboxyl groups, such as aromatic carbocyclic hydrocarbons and aromatic heterocyclic hydrocarbons. The invention more particularly relates to a process of obtaining primarily symmetrical di- and tricarboxylic acids from mixtures of aromatic compounds free of carboxyl groups and alkali metal salts of aliphatic carboxylic acids.

As was previously found, aromatic di- and polycarboxylic acids or their salts may be produced by heating salts of aromatic carbocyclic and heterocyclic monocarboxylic acids in admixture with salts of aromatic carbocyclic and heterocyclic polycarboxylic acids which contain more than two carboxyl groups in the molecule to a temperature above 300° C., and transforming the salts thus obtained into the free acids, if desired. During this reaction a migration of carboxyl groups from one molecule to the other as well as possibly a rearrangement of carboxyl groups within the molecule takes place, so that, for example, two mols potassium terephthalate are obtained from one mol potassium benzoate and one mol of the potassium salt of a benzene tricarboxylic acid.

It is an object of this invention to produce symmetrical aromatic carbocyclic and heterocyclic polycarboxylic acids, primarily di- and tricarboxylic acids by interreactions of both carbocyclic and heterocyclic aromatic compounds free from carboxyl groups with alkali metal salts of both aliphatic carboxylic and polycarboxylic acids.

It is a further object of this invention to produce mixtures of symmetrical aromatic carbocyclic dicarboxylic acids and symmetrical aromatic heterocyclic dicarboxylic acids by the interaction of aromatic heterocyclic compounds free from carboxyl groups with alkali metal salts of aliphatic carboxylic or polycarboxylic acids.

It is a still further object of this invention to produce pyridine di- and tricarboxylic acids by the interaction of pyridine and alkali metal salts of aliphatic hydrocarbon dicarboxylic acids.

It is another object of this invention to produce terephthalic acids by the interaction of benzene and alkali metal salts of oxalic acid.

It is another object of this invention to produce furan monocarboxylic acid by the interaction of furan and alkali metal salts of oxalic acid.

These and other objects of this invention will become apparent as the description thereof proceeds.

We have found that carboxyl groups can be introduced into aromatic carbocyclic or aromatic heterocyclic compounds free from carboxyl groups by reacting the same in the absence of substantial amounts of oxygen, such as in a non-oxidative atmosphere and under anhydrous conditions, with alkali metal salts of aliphatic carboxylic acids at temperatures above about 300° C. under pressure and, optionally, in the presence of suitable catalysts. During the reaction according to the invention, the carboxyl groups from the carboxylic acid salts serving as starting materials are entirely or partially transferred to the nucleus of the aromatic carbocyclic or aromatic heterocyclic compound free from carboxyl groups. For example, in accordance with the process of the invention, the potassium salts of isocinchomeronic acid (pyridine-2,5-dicarboxylic acid) and pyridine-2,4,6-tricarboxylic acid can be obtained from pyridine and potassium oxalate. The corresponding free acids of their derivatives may then be obtained from the salts produced in the above manner in accordance with known methods.

The reaction of aromatic carbocyclic and aromatic heterocyclic compounds free from carboxyl groups with aromatic carboxylic acids is the subject matter of prior application Serial No. 797,600, filed March 6, 1959, in the name of Blaser et al. and is not claimed within the scope of the present application.

Suitable compounds free from carboxyl groups which may be used as starting materials for the process according to the invention are aromatic carbocyclic compounds free from carboxyl groups; for example, monocyclic aromatic hydrocarbons such as benzene or its derivatives having saturated alkyl or cycloalkyl substituents attached thereto; dicyclic aromatic hydrocarbons such as naphthalene, diphenyl; and other polycyclic aromatic hydrocarbon compounds. Similarly, aromatic heterocyclic compounds free from carboxyl groups may be used as starting materials for the process of the invention. This includes those heterocyclic compounds which contain one or more hetero atoms in the ring and which are designated as having an aromatic character because of their chemical behavior.

Examples of such compounds are monocyclic and dicyclic aromatic nitrogen-heterocyclic hydrocarbon compounds of the pyridine series, such as pyridine, quinoline, isoquinoline, $\alpha,\alpha$-dipyridyl and the like; monocyclic and dicyclic aromatic sulfur-heterocyclic hydrocarbon compounds of the thiophene series such as thiophene, thionaphthene and the like; and monocyclic aromatic oxygen-heterocyclic hydrocarbon compounds of the furan series, such as furan, methyl furan and the like.

The above-described starting materials may carry substituents such as hydrocarbon radicals or other substituents, for example, ether groups or halogen atoms, provided that under prevailing reaction conditions a destruction of the molecule does not occur by virtue of these substituents.

The aliphatic carboxylic acids which are used in the form of their alkali metal salts, especially their potassium salts, for the transfer of carboxyl groups to the above-mentioned aromatic carbocyclic or aromatic heterocyclic compounds may be of varying structure. It is preferred to use those aliphatic carboxylic acids, the carboxyl groups of which are labile by virtue of the molecular structure or the presence of substituents. Examples of such compounds are oxalic acid, malonic acid, maleic acid, trichloroacetic acid and the like. Particularly favorable results are obtained in many cases with the alkali metal salts of oxalic acid.

The above-mentioned acids or their mixtures are used for the process according to the invention in the form of their alkali metal salts. It is preferred to treat the salts of potassium because particularly good results are achieved therewith. The rubidium and cesium salts, which produce equally good yields, are less desirable for economic reasons. The sodium and lithium salts may likewise be used.

The reaction according to our invention is in many cases favored by the presence of certain catalysts. Suitable catalysts for the process according to the invention are primarily cadmium in metallic form and its compounds; for example, its oxide or its salts formed with inorganic or organic acids, also metal-organic or complex compounds of cadmium. Similarly, a few other metals, especially zinc and mercury, as well as compounds of these metals, may be used. The amount of catalyst added to the starting materials may vary within rather wide limits, namely from 0 to about 15% by weight of reactants and preferably from about 0.5 to about 5% by weight of the starting materials. Most advantageously, the catalyst is provided in finely divided state and uniformly distributed throughout the starting materials. This is advantageously accomplished by mixing the dry ingredients intimately, such as by ball milling.

For the performance of the process according to the invention, it is necessary to exclude the presence of substantial quantities of oxygen. It is therefore advantageous to operate in the presence of a suitable non-oxidative and protective atmosphere, preferably in the presence of carbon dioxide under pressure. However, other inert, non-oxidative and protective gases, for example nitrogen or argon, may be used as such or possibly in admixture with carbon dioxide. These gases are ordinarily employed under superatmospheric pressures.

For the performance of the process according to our invention, it is further necessary to substantially exclude the presence of water. All of the starting materials are therefore preferably used in a carefully dried or anhydrous state. In order to exclude the presence of small amounts of water which may either be present in the starting materials or which may form due to side reactions or decomposition reactions, it is advantageous to add to the reaction mixture water-binding materials which are capable of tying up or reacting with water under the prevailing reaction conditions without interfering with the reaction proper. Such water-binding materials may be of a chemically very different nature. Suitable are, for example, carbides of various earth metals, such as aluminum carbide, or also carbides of alkaline-earth metals or alkali metals, such as calcium carbide. Similarly, other compounds of the above-mentioned metals, such as their nitrides or borides or cyanates, especially potassium cyanate, may be used as well as elemental silicon or boron or various organic compounds with these elements, such as silicon tetraphenyl. These water-binding materials should likewise be added in a finely divided state and be intimately mixed with the other reactants. The reaction occurs in good yields in the absence of a water-binding agent if the starting materials are anhydrous.

In general, the reaction according to the invention begins to occur at a temperature above 300° C. The optimum reaction temperature varies and depends upon the starting material used. The upper temperature limit is determined by the decomposition temperature of the starting materials or the reaction products. The preferred temperatures are between about 350° C. and about 450° C. for most starting materials.

The separation of the reaction mixtures is, as a rule, simple. The unreacted aromatic hydrocarbons free from carboxyl groups or aromatic heterocyclic hydrocarbons free from carboxyl groups may be recovered. In the performance of the process on an industrial scale the aromatic compounds may be recycled. The same applies to the inert gas which is employed; for example, the carbon dioxide may be used over again after a suitable purification, if necessary. Similarly, other additives, such as the catalyst, may be used several times. The various carboxylic acids may be separated by conventional methods.

The process according to the invention in many cases yields technically valuable symmetrical aromatic carbocyclic or aromatic heterocyclic di- or polycarboxylic acids or their salts, such as terephthalic acid, naphthalene-2,6-dicarboxylic acid, isocinchomeronic acid, trimesic acid, or pyridine-2,4,6-tricarboxylic acid. Other aromatic symmetrical polycarboxylic acids, such as trimesic acid, are often formed as side products. In addition, mono- carboxylic acids, such as benzoic acid, furan monocarboxylic acid and the like, are frequently recovered, especially if a monocarboxylic acid salt be used as a starting material.

The following examples will further illustrate our invention and enable persons skilled in the art to understand the invention more completely. It is understood, however, that the examples are illustrative only and that our invention is not limited to these particular examples.

*Example I*

33.2 gm. of anhydrous dipotassium oxalate together with 275 cc. of pyridine were heated for 16 hours at 419° C. in an autoclave having a capacity of 600 cc. At the beginnig of the run a sufficient amount of carbon dioxide was introduced into the autoclave so that a pressure of 1475 atmospheres developed at the reaction temperature. After cooling and releasing the pressure from the autoclave, the solid reaction mixture was separated from excess pyridine by filtration. The solid portion, which weighed 36.5 gm., was dissolved in 600 cc. of water. The solution was filtered and concentrated to 300 cc. by evaporation. Subsequently, the solution was acidified with the calculated amount of hydrochloric acid. After cooling the acidified solution to 0° C., 12.7 gm., of the monopotassium salt of pyridine-2,4,6-tricarboxylic acid crystallized out. 4.0 gm. of oxalic acid were recovered from the mother liquor by extraction with ether.

*Example II*

A mixture consisting of 33.2 gm. of anhydrous dipotassium oxalate, 10.0 gm. of aluminum carbide and 2.0 gm. of cadmium fluoride was heated, together with 150 cc. of pyridine, for 16 hours at 410° C. in an autoclave having a net volume of 600 cc. At the beginning of the run a sufficient amount of carbon dioxide was introduced into the autoclave under pressure so that a pressure of 100 atmospheres developed at the reaction temperature. The reaction mixture, which weighed 48.8 gm., was worked up in the manner described in Example I. 5.5 gm. of a mixture consisting of the monopotassium salts of isocinchomeronic acid (pyridine-2,5-dicarboxylic acid) and pyridine-2,4,6-tricarboxylic acid were obtained.

*Example III*

A mixture consisting of 33.2 gm. of dipotassium oxalate and 2.0 gm. of cadmium fluoride was heated, together with 250 cc. pyridine, for 16 hours at 410° C. in an autoclave having a net volume of 600 cc. At the beginning of the run a sufficient amount of nitrogen was introduced into the autoclave by means of a compressor so that a pressure of 1450 atmospheres resulted at the reaction temperature. The reaction was worked up in the above-described manner (Example I) after having separated the excess pyridine by filtration. 8.5 gm. of the monopotassium salt of pyridine-2,4,6-tricarboxylic acid, admixed with small amounts of isocinchomeronic acid, were obtained. 1.6 gm. oxalic acid were recovered from the mother liquor by extraction with ether.

*Example IV*

A mixture consisting of 33.2 gm. of anhydrous dipotassium oxalate, 10.0 gm. of aluminum carbide (grain size 0.06 mm.) and 2.0 gm. of cadmium fluoride was heated, together with 250 cc. pyridine, for 16 hours at 410° C. in an autoclave having a capacity of 600 cc. At the beginning of the run a sufficient amount of carbon dioxide was introduced into the autoclave under pressure so that a pressure of 1160 atmospheres developed at the reaction temperature. After cooling and releasing the pressure from the autoclave, the reaction product, which weighed 55.6 gm., was dissolved in 1000 cc. water. The solution was filtered and was concentrated to 300 cc. by evaporation. Thereafter, it was once again filtered. The filtrate was acidified to a pH of 2.5. After cooling the solution to 0° C., 20.05 gm. of the monopotassium salt of isocinchomeronic acid were isolated.

Example V

A finely powdered mixture consisting of 33.2 gm. of anhydrous potassium oxalate, 12.0 gm. of technical-grade calcium carbide and 5.0 gm. of cadmium fluoride was heated, together with 75 cc. anhydrous benzene, in a rotary autoclave having a capacity of 200 cc. for 16 hours at 410° C. in an atmosphere of carbon dioxide at an initial pressure of 50 atmospheres. A maximum pressure of 240 atmospheres developed during the reaction. After releasing the pressure and cooling the autoclave, the reaction product was suspended in 500 cc. of water, the suspension was boiled for a few minutes after adding 20.0 gm. of potassium carbonate thereto, and the hot suspension was subsequently filtered. The filtrate was acidified with dilute sulfuric acid. Thereafter, the oxalate was destroyed by addition of solid potassium permanganate. The excess permanganate was removed and the precipitated manganese dioxide was brought into solution by adding hydrogen peroxide. The precipitated terephthalic acid was isolated. The yield was 3.2 gm. 0.3 gm. of water-soluble aromatic carboxylic acids were obtained from the filtrate by extraction with ether.

Example VI

A finely powdered mixture consisting of 33.2 gm. of anhydrous potassium oxalate, 10.0 gm. of technical-grade calcium carbide and 5.0 gm. of cadmium fluoride was heated, together with 75 cc. anhydrous benzene, for 18 hours at 400° C. in a rotary autoclave having a capacity of 200 cc. in an atmosphere of carbon dioxide at an initial pressure of 50 atmospheres. During the reaction a maximum pressure of 250 atmospheres developed. The reaction product was worked up as described in Example V and 3.2 gm. of telephthalic acid were obtained. By extraction from the filtrate with ether, 1.3 gm. of a mixture of trimesic acid and small amounts of benzoic acid were obtained.

Example VII

Molten potassium cyanate was admixed with an equal amount by weight of technical-grade calcium carbide. After cooling, the melt was pulverized. A finely powdered mixture consisting of 33.2 gm. of potassium oxalate, 12.0 gm. of the above-described pulverized melt and 5.0 gm. of cadmium fluoride was heated, together with 75 cc. anhydrous benzene, for 16 hours at 400° C. in a rotary autoclave having a capacity of 200 cc. in an atmosphere of carbon dioxide at an initial pressure of 50 atmospheres. A maximum pressure of 190 atmospheres developed during the reaction. The reaction product was worked up as described in Example V. 4.1 gm. of terephthalic acid were obtained, and by extracting the filtrate with ether 0.2 gm. of other aromatic carboxylic acids were obtained.

Example VIII

A mixture consisting of 18.0 gm. of anhydrous potassium trichloroacetate, 10.0 gm. of technical-grade calcium carbide and 5.0 gm. of cadmium fluoride was heated, together with 75 cc. benzene, for 10 hours at 410° C. in a rotary autoclave having a capacity of 200 cc. in an atmosphere of carbon dioxide at an initial pressure of 50 atmospheres. A maximum pressure of 260 atmospheres developed during the reaction. The reaction product was worked up as described in Example V. By extracting the acid solution with ether, 1.1 gm. of benzoic acid were obtained.

Example IX

A mixture of 30.0 gm. of anhydrous potassium oxalate, 5.0 gm. of technical-grade calcium carbide and 3.0 gm. of cadmium fluoride was heated, together with 30.0 gm. furan, for 5 hours at 350° C. in a rotary autoclave having a capacity of 200 cc. in an atmosphere of carbon dioxide at an initial pressure of 50 atmospheres. A pressure of 180 atmospheres developed during this period. The reaction product was worked up as described in Example II. 0.8 gm. of furan monocarboxylic acid were obtained.

Example X

A mixture consisting of 40.0 gm. of the dipotassium salt of maleic acid, 20.0 gm. of technical-grade calcium carbide and 5.0 gm. of cadmium fluoride was heated, together with 60 cc. anhydrous benzene, for 15 hours at 410° C. in a rotary autoclave having a capacity of 200 cc. in an atmosphere of carbon dioxide at an initial pressure of 50 atmospheres. A pressure of 170 atmospheres developed during this period. The reaction product was worked up as described in Example V. 1.0 gm. of benzoic acid was obtained.

Example XI

A mixture consisting of 33.2 gm. of potassium oxalate, 5.0 gm. of powdered silicon and 2.0 gm. of anhydrous zinc chloride was heated, together with 250 cc. pyridine, for 16 hours at 410° C. in an autoclave having a capacity of 600 cc. At the beginning of the run a sufficient amount of carbon dioxide was introduced into the autoclave under pressure to that a pressure of 1500 atmospheres developed at the reaction temperature.

After cooling and releasing the pressure from the autoclave, the solid components of the reaction mixture were separated from excess pyridine by filtration. The solid components were then dissolved in 600 cc. water and the solution was filtered. The filtrate was acidified with the calculated amount of hydrochloric acid. Upon cooling the acidified solution to 0° C., 5.1 gm. of the monopotassium salt of pyridine-2,4,6-tricarboxylic acid crystallized out. 2.0 gm. of oxalic acid were recovered from the mother liquor by extraction with ether.

Example XII

A mixture consisting of 33.2 gm. of dipotassium oxalate, 10.0 gm. of aluminum carbide, 3.0 gm. of cadmium fluoride and 100.0 gm. of naphthalene was heated for 30 hours at 400° C. in an autoclave having a capacity of 600 cc. At the beginning of the run a sufficient amount of $CO_2$ was introduced into the autoclave under pressure so that a pressure of 1200 atmospheres developed at the reaction temperature. After cooling and releasing the pressure from the autoclave, the reaction product was comminuted and boiled several times with acetone to remove the excess naphthalene. Subsequently, the product was dissolved in hot water and the solution was filtered. The filtrate was acidified with hydrochloric acid. The crystals which precipitated upon acidification were isolated. Thereafter, the mother liquor was extracted with ether. A total of 5.4 gm. of naphthalene-2,6-dicarboxylic acid were obtained in this manner, which were contaminated with small amounts of other naphthalene carboxylic acids.

The above examples disclose the wide range of reaction conditions within which the process of the invention occurs. Various mono- and dicyclic aromatic hydrocarbons and aromatic heterocyclic starting materials free from carboxyl groups are shown as operative as well as various aliphatic carboxylic acids. Various alkali metal salts of the acids can be employed, although the potassium salts are preferred. While cadmium fluoride is a convenient catalyst to employ, either inorganic or organic or other metallic catalysts may be employed. As water-binding agent, any of a number of compounds may be employed. Aluminum carbide is excellent, although other agents can be employed with similar results. Example III discloses the use of nitrogen atmosphere. While various pressures may be employed, pressures of 1000 to 1500 atmospheres at the reaction temperature give slightly better yields.

It is readily apparent to those skilled in the art that various substitutions and modifications can be made in the above examples without departing from the spirit of the invention or the scope of the appended claims.

We claim:
1. The process of producing mono- and dicyclic alkali metal salts of aromatic acids selected from the group consisting of aromatic carbocyclic and aromatic heterocyclic acids, said acids having from 1 to 3 carboxyl groups in the molecule, which comprises heating under anhydrous conditions an alkali metal salt of an aliphatic carboxylic acid having a labile carboxyl group selected from the group consisting of oxalic, maleic and trichloroacetic acids and mono- and dicyclic aromatic compounds free from carboxyl groups selected from the group consisting of aromatic hydrocarbon and unsubstituted aromatic heterocyclic compounds having as the only hetero atom a single atom selected from the group consisting of sulfur, nitrogen and oxygen to a temperature between 300° C. and the decomposition temperature of the starting materials and the reaction products in the substantially oxygen-free atmosphere of an inert gas to produce a mixture of said alkali metal salts of aromatic acids and starting compounds and separating the starting compounds from the aromatic acid salts.

2. The process of producing mono- and dicyclic aromatic acids selected from the group consisting of aromatic carbocyclic and aromatic heterocyclic acids, said acids having from 1 to 3 carboxyl groups in the molecule, which comprises heating, under anhydrous conditions, an alkali metal salt of an aliphatic carboxylic acid having a labile carboxyl group selected from the group consisting of oxalic, maleic and trichloroacetic acids and mono- and dicyclic aromatic compounds free from carboxyl groups selected from the group consisting of aromatic hydrocarbon and unsubstituted aromatic heterocyclic compounds having as the only hetero atom a single atom selected from the group consisting of sulfur, nitrogen and oxygen to a temperature between 300° C. and the decomposition temperature of the starting materials and the reaction products in the substantially oxygen-free atmosphere of an inert gas to produce a mixture of said alkali metal salts of aromatic acids and starting compounds, converting the alkali metal salts of said aromatic acids into the corresponding free acids and separating said free acids from the reaction mass.

3. The process of claim 1 wherein said reaction is conducted in the presence of a catalyst selected from the group consisting of cadmium, zinc and compounds thereof.

4. The process of claim 1 wherein said reaction is conducted in the presence of a water-binding agent capable of tying up water under the prevailing reaction conditions without interfering with the reaction.

5. The process of claim 1 wherein said reaction is carried out under a superatmospheric pressure of carbon dioxide.

6. The process of producing mono- and dicyclic alkali metal salts of aromatic acids selected from the group consisting of aromatic carbocyclic and aromatic heterocyclic acids, said acids having from 1 to 3 carboxyl groups in the molecule, which comprises heating under anhydrous conditions an alkali metal salt of an aliphatic carboxylic acid having a labile carboxyl group selected from the group consisting of oxalic, maleic and trichloroacetic acids and mono- and dicyclic aromatic compounds free from carboxyl groups selected from the group consisting of aromatic hydrocarbon and unsubstituted aromatic heterocyclic compounds having as the only hetero atom a single atom selected from the group consisting of sulfur, nitrogen and oxygen in the presence of a catalyst selected from the group consisting of cadmium, zinc and compounds thereof and a water-binding agent selected from the group consisting of metal carbides, metal cyanates and elemental silicon to a temeprature between 300° C. and the decomposition temperature of the starting materials and the reaction products in the substantially oxygen-free atmosphere of an inert gas selected from the group consisting of carbon dioxide, nitrogen and argon to produce a mixture of said alkali metal salts of aromatic acids and starting compounds and separating the starting compounds from the aromatic acid salts.

7. The process of producing mono- and dicyclic aromatic acids selected from the group consisting of aromatic carbocyclic and aromatic heterocyclic acids, said acids having from 1 to 3 carboxyl groups in the molecule, which comprises heating, under anhydrous conditions, an alkali metal salt of an aliphatic carboxylic acid having a labile carboxyl group selected from the group consisting of oxalic, maleic and trichloroacetic acids mono- and dicyclic aromatic compounds free from carboxyl groups selected from the group consisting of aromatic hydrocarbon and unsubstituted aromatic heterocyclic compounds having as the only hetero atom a single atom selected from the group consisting of sulfur, nitrogen and oxygen in the presence of a catalyst selected from the group consisting of cadmium, zinc and compounds thereof and a water-binding agent selected from the group consisting of metal carbides, metal cyanates and elemental silicon to a temperature between 300° C. and the decomposition temperature of the starting materials and the reaction products in the substantially oxygen-free atmosphere of an inert gas selected from the group consisting of carbon dioxide, nitrogen and argon to produce a mixture of said alkali metal salts of aromatic acids and starting compounds, converting the alkali metal salts of the aromatic acids into said corresponding free acids and separating said free acids from the reaction mass.

8. The process of producing alkali metal salts of benzene carboxylic acids which comprises heating, under anhydrous conditions, an alkali metal salt of an aliphatic carboxylic acid having a labile carboxyl group selected from the group consisting of oxalic, maleic and trichloroacetic acids and benzene in the presence of a cadmium catalyst and a water-binding agent selected from the group consisting of metal carbides, metal cyanates and elemental silicon to a temperature between about 350° C. and about 450° C. under a superatmospheric pressure of an inert gas selected from the group consisting of carbon dioxide, nitrogen and argon, and recovering alkali metal salts of benzene carboxylic acids.

9. The method of claim 8 wherein said alkali metal salt of an aliphatic carboxylic acid having a labile carboxyl group is dipotassium oxalate.

10. The method of claim 8 wherein said alkali metal salt of an aliphatic carboxylic acid having a labile carboxyl group is dipotassium maleate.

11. The method of claim 8 wherein said alkali metal salt of an aliphatic carboxylic acid having a labile carboxyl group is potassium trichloroacetate.

12. The process of producing terephthalic acid which comprises heating, under anhydrous conditions, a potassium salt of an aliphatic carboxylic acid having a labile carboxyl group selected from the group consisting of oxalic, maleic and trichloroacetic acids and benzene in the presence of a cadmium fluoride catalyst and calcium carbide to a temperature between about 350° C. and about 450° C. under a superatmospheric pressure of carbon dioxide, separating unreacted benzene from the reaction mass, dissolving the reaction mass in hot water, acidifying to precipitate terephthalic acid and separating said terephthalic acid from the mother liquor.

13. The process of producing dipotassium terephthalate which comprises heating, under anhydrous conditions, a potassium salt of oxalic acid and benzene in the persence of a cadmium fluoride catalyst and calcium carbide to a temperature between about 350° C. and about 450° C. under a superatmospheric pressure of carbon dioxide, separating unreacted benzene from the reaction mass, and separating dipotassium terephthalate from the reaction mass.

14. The process of producing alkali metal salts of a mixture of symmetrical mono- and dicyclic aromatic hydrocarbon polycarboxylic acids which comprises heating, under anhydrous conditions, an alkali metal salt of an aliphatic carboxylic acid having a labile carboxyl group selected from the group consisting of oxalic, maleic and trichloroacetic acids and unsubstituted mono- and dicyclic aromatic hydrocarbons in the presence of a cadmium catalyst and water-binding agent selected from the group consisting of metal carbides, metal cyanates and elemental silicon to a temperature between about 350° C. and about 450° C. under a superatmospheric pressure of carbon dioxide and recovering alkali metal salts of a mixture of symmetrical aromatic hydrocarbon polycarboxylic acids.

15. The process of producing alkali metal salts of symmetrical naphthalene polycarboxylic acids which comprises heating, under anhydrous conditions, an alkali metal salt of an aliphatic carboxylic acid having a labile carboxyl group selected from the group consisting of oxalic, maleic and trichloroacetic acids and naphthalene in the presence of a cadmium catalyst and a water-binding agent selected from the group consisting of metal carbides, metal cyanates and elemental silicon to a temperature between about 350° C. and about 450° C. under a super atmospheric pressure of carbon dioxide and recovering alkali metal salts of symmetrical naphthalene polycarboxylic acids.

16. The process of producing naphthalene-2,6-dicarboxylic acid which comprises heating, under anhydrous conditions, an alkali metal salt of oxalic acid and naphthalene in the presence of a cadmium fluoride catalyst and aluminum carbide to a temperature between about 350° C. and about 450° C. under a superatmospheric pressure of carbon dioxide, extracting unreacted naphthalene, adding water to dissolve the alkali metal salts of naphthalene-2,6-dicarboxylic acid in aqueous solution, acidifying the solution to precipitate naphthalene-2,6-dicarboxylic acid and recovering said precipitate from the mother liquor.

17. The process of producing alkali metal salts of mono- and dicyclic aromatic nitrogen-heterocyclic polycarboxylic acids which comprises heating, under anhydrous conditions, an alkali metal salt of an aliphatic carboxylic acid having a labile carboxyl group selected from the group consisting of oxalic, maleic and trichloroacetic acids and unsubstituted mono- and dicyclic aromatic nitrogen-heterocyclic compounds containing a single nitrogen atom in the cyclic ring in the presence of a catalyst selected from the group consisting of cadmium, zinc, mercury, and compounds thereof and a water-binding agent selected from the group consisting of metal carbides, metal cyanates and elemental silicon to a temperature between about 350° C. and about 450° C. under a superatomospheric pressure of an inert gas selected from the group consisting of carbon dioxide, nitrogen and argon, recovering a mixture of said alkali metal salts of aromatic nitrogen-heterocyclic polycarboxylic acids and starting materials and separating said alkali metal salts.

18. The process of producing alkali metal salts of mono- and dicyclic aromatic oxygen-heterocyclic carboxylic acids which comprises heating, under anhydrous conditions, an alkali metal salt of an aliphatic carboxylic acid having a labile carboxyl group selected from the group consisting of oxalic, maleic and trichloroacetic acids and unsubstituted mono- and dicyclic aromatic oxygen-heterocyclic compounds containing a single oxygen atom in the cyclic ring in the presence of a catalyst selected from the group consisting of cadmium, zinc, mercury, and compounds thereof and a water-binding agent selected from the group consisting of metal carbides, metal cyanates and elemental silicon to a temperature between about 350° C. and about 450° C. under a superatmospheric pressure of an inert gas selected from the group consisting of carbon dioxide, nitrogen and argon, recovering a mixture of said alkali metal salts of aromatic oxygen-heterocyclic carboxylic acids and starting materials, and separating said alkali metal salts.

19. The process of producing a mixture of alkali metal salts of pyridine-2,4,6-tricarboxylic acid and alkali metal salts of isocinchomeronic acid which comprises heating, under anhydrous conditions, an alkali metal salt of an aliphatic carboxylic acid having a labile carboxyl group selected from the group consisting of oxalic, maleic and trichloroacetic acids and pyridine to a temperature between about 350° C. and about 450° C. under a superatmospheric pressure of carbon dioxide, recovering a mixture of alkali metal salts of pyridine-2,4,6-tricarboxylic acid and alkali metal salts of isocinchomeronic acid and separating said alkali metal salts.

20. The method of claim 14 wherein said alkali metal salt of an aliphatic carboxylic acid having a labile carboxyl group is dipotassium oxalate.

21. The process of producing the mono-alkali metal salts of pyridine-2,4,6-tricarboxylic acid and isocinchomeronic acid which comprises heating, under anhydrous conditions, an alkali metal salt of an aliphatic carboxylic acid having a labile carboxyl group selected from the group consisting of oxalic, maleic and trichloroacetic acids and pyridine in the presence of a catalyst selected from the group consisting of cadmium, zinc, mercury, and compounds thereof and a water-binding agent selected from the group consisting of metal carbides, metal cyanates and elemental silicon to a temperature between about 350° C. and about 450° C. under a superatmospheric pressure of carbon dioxide, recovering a mixture of alkali metal salts of pyridine-2,4,6-tricarboxylic acid and alkali metal salts of isocinchomeronic acid, dissolving said mixture of salts in water, acidifying to precipitate the mono-alkali metal salts of pyridine-2,4,6-tricarboxylic acid and isocinchomeronic acid and separating said mono-alkali metal salts from said mother liquor.

22. The method of claim 21 wherein said alkali metal salt of an aliphatic carboxylic acid having a labile carboxyl group is dipotassium oxalate and the monopotassium salts are recovered.

References Cited in the file of this patent
UNITED STATES PATENTS

| | | |
|---|---|---|
| 2,794,830 | Raecke et al. | June 4, 1957 |
| 2,823,229 | Raecke | Feb. 11, 1958 |
| 2,863,913 | Raecke et al. | Dec. 9, 1958 |
| 2,900,386 | Raecke et al. | Aug. 18, 1959 |

UNITED STATES PATENT OFFICE
CERTIFICATE OF CORRECTION

Patent No. 3,023,217            February 27, 1962

Werner Stein et al.

It is hereby certified that error appears in the above numbered patent requiring correction and that the said Letters Patent should read as corrected below.

Column 1, lines 19 and 20, for "carboxylic acids." read -- carboxylic or polycarboxylic acids. --; column 2, line 5, for "of" read -- or --; column 4, line 14, for "419° C." read -- 410° C. --; column 5, line 37, for "telephthalic" read -- terephthalic --; column 6, line 25, for "to" read -- so --; column 8, line 13, after "acids" insert -- and --; line 29, for "the", second occurrence, read -- said --; same column 8, line 30, for "said" read -- the --.

Signed and sealed this 6th day of November 1962.

(SEAL)
Attest:

ERNEST W. SWIDER
Attesting Officer

DAVID L. LADD
Commissioner of Patents